Nov. 10, 1936.  J. HEIDRICH  2,060,499
FISHING LEADER
Filed March 23, 1936

INVENTOR.
JOHN HEIDRICH.
BY Horace Barnes,
ATTORNEY.

Patented Nov. 10, 1936

2,060,499

UNITED STATES PATENT OFFICE 2,060,499

FISHING LEADER

John Heidrich, Los Angeles, Calif.

Application March 23, 1936, Serial No. 70,266

9 Claims. (Cl. 43—28)

This invention relates to improvements in fishing apparatus, and particularly to wire or other leaders utilized for connecting a fishing-hook to a line, and to the method of forming the same.

One of the objects of my invention is to provide a fishing-line leader having terminal loops formed therein of novel and practicable formation and arrangement whereby a yielding but tenacious connection of the loop-parts is afforded without kinking or knotting of the leader so that no weakness is introduced therein where the leader is formed of wire.

A further object of the invention is the provision of a protective armor of simple construction enveloping the loop-portion of my improved leader comprising a tube of closely coiled wire through which the loop-line is threaded whereby the line of the loop is safeguarded against abrasion from the attached hook and the loop is resiliently distended to further prevent the kinking thereof.

A still further object of my invention resides in the employment in combination of the said novel means of connection whereby the terminal loops are formed in my improved leader together with the protective armor for the loop itself, the whole comprising substantially complete provision for the safety of the leaders, particularly when they are formed of wire, against faults and weakness due to sharp bends or kinking of the same.

A still further object of my invention consists in the novel method of forming, and securing terminal loops in fishing-lines or leaders, and protecting the same with protective armor.

Other objects and advantages residing in my invention, and objects relating to details of construction and arrangements of parts thereof will be readily apparent in the course of the detailed description to follow.

The accompanying drawing illustrates by way of example representative forms of my invention, in which.

Figure 1:
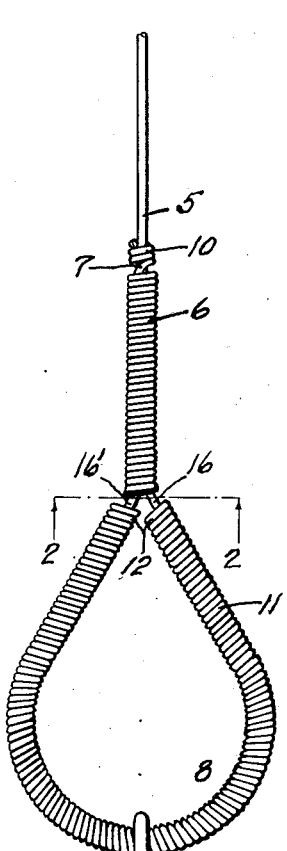
Figure 1 is a view in side elevation of an end of a wire leader including a loop formed therein constructed in accordance with my invention.
Figure 2:
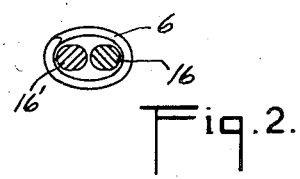
Fig. 2 is a view in cross-section upon an enlarged scale taken on line 2—2 of Fig. 1.

Referring to said views, wherein similar parts in the several views are designated by corresponding reference characters, and particularly to Figs. 1 and 2 representing a wire leader, or one end thereof, it being understood that the opposite end of said leader is formed in like manner and is adapted for connection with a fishing-line, not shown, the reference numeral 5 indicates the standing part of said leader which is extended through a flexible tube 6 formed of a spiral coil of metallic wire of suitable resiliency. The free end 7 of the leader is then reversely threaded through the tube 6 to form a loop 8 of the desired size. The free end 7 projecting from the upper end of the tube is then coiled about the standing part 5, as at 10, and its end trimmed closely to the part 5 to leave no projecting portions. A pull or strain upon the loop 8 thus formed will jam the coil 10 upon the tube 6 and prevent any further enlargement of the loop.

Prior to the said reverse threading of the free end 7 of the loop through the tube 6 a somewhat similar tube 11 of closely coiled wire is threaded thereon to form a protective armor for the loop and which is desirably of sufficient length so that when the loop is completed in the manner described the opposite ends 12 of the armor-coil will extend in proximity to the lower end of the tube 6 thus effectively enclosing the loop. The form of the loop causes the coils of the wire tube 11 to press closely together on the inside of the loop especially at the lower portion of the loop thereby affording thorough protection for the line forming the loop from contact and consequent abrasion with the hook 13 or at the opposite end of the leader with the fishing-line or such convenient intermediate devices as a split ring 15, see Fig. 3, a swivel or the like. In the event the hook 13 is secured directly in the loop it is evident that it will be attached thereto at the time of forming the loop as in the case of the mounting thereon of the tube 11.

The invention is primarily designed for use on wire leaders and particularly those formed of so-called piano-wire whose qualities of strength and tenacity are only available where there are no kinks or sharp bends formed therein. All methods of forming loops in piano-wire leaders known to me have resulted in kinking or sharply bending the wire or have formed nodes therein which under the severe strains encountered in fishing for large fish or in the repeated warping and flexing of the line in casting is almost certain to develop a fault which is apt to give way under shock and result in lost fish and tackle. It will be evident from the foregoing taken with the illustrated embodiment shown in Figs. 1 and 2 that the leader is well-nigh entirely free from the faults above outlined; that the standing part 5 extends through the tube 6 in a straight line and deflects at 16 at the lower extremity of the tube in an easy tube that tends to bear against the tube 6; that said tube will yield and incline to assume an elliptical form at its lower extremity, as shown in Fig. 2; that the effect of the tube 11 is to distend the loop and cause the same to spread laterally, which together with the consequent distribution of strains and the protection afforded from abrasion and the direct application of the strains from the hook at the point where the hook is connected substantially safeguards the loop from damage; that the line in passing reversely through the tube 6 is likewise extended in straight lines and is protected at 16' in a similar manner as mentioned with respect to the part 16; that the twisting of the line about the standing part 5 at its extremity, as at 10, does not adversely effect, weaken or bend the standing part; and that, finally, all parts of the leader included in the loop parts are securely and resiliently associated and combined to fully protect the loop from kinking and abrasion.

Figure 3:
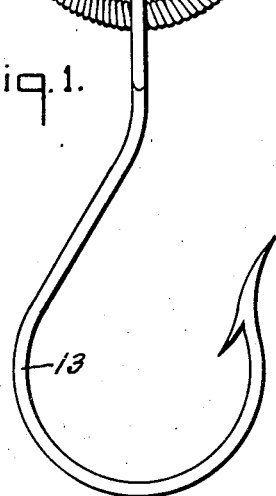
Fig. 3 is a view similar to Fig. 1 representing a catgut leader with an embodiment of my invention incorporated therein, portions of the connective and protective devices being broken away.
Figure 3:
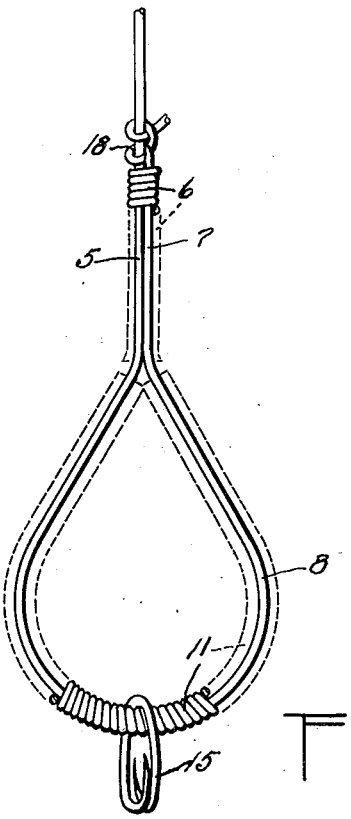

The form of the invention shown in Fig. 3 relates to leaders or lines formed of more flexible material such as catgut or cord and wherein the principal factor to guard against is abrasion which safeguard is supplied principally by the tube 11 although the provision of the tube 6 affords a convenient and effective form of tie for the loop. In this form of the invention no objection is apparent in the forming of knots in the line, hence the use as shown of simple half-hitches 18 to secure the extremity of the line.

Having described my invention, what I claim, is:—

1. A leader comprising a line, a flexible tube through which said line extends, said line being reversely threaded through said tube to form a loop and extending from the upper end of said tube, and means to secure the extremity of said line from retraction through said tube.

2. The leader formed as set forth in claim 1, together with a flexible tube enveloping the loop portion of said line.

3. A leader comprising a resilient tube having the standing part of the leader threaded therethrough and reversely threaded through said tube to form a loop, the reversely threaded portion being formed to prevent retraction through said tube.

4. The leader formed as set forth in claim 3, in combination with a resilient tube secured about the portion of the leader forming the loop.

5. A leader comprising a standing part, a spiral spring coil through which said standing part extends, the end projecting from said coil being reversely threaded through said coil to form a loop, and means to secure the extremity of said reversely threaded portion from retraction through said coil.

6. The leader formed as set forth in claim 5, wherein a spiral spring coil is threaded upon said loop portion to expand the same and to protect the loop from abrasion.

7. A leader formed with a loop at its extremity, and a coil of spiral-spring form through which the line forming said loop is threaded.

8. The method of forming loops upon fishing-leaders, consisting of extending the line of said leader axially through a spiral coil of wire, reversely threading the end of said line through said coil to form a loop, and securing the end of said line to prevent the same from retraction through said coil.

9. The method of forming loops upon fishing-leaders, consisting of extending the line of said leader axially through a spiral coil of wire, threading a similar coil of wire upon said line extending from said first named coil, reversely threading the end of said line through said first named coil to form a loop upon which said second named coil is threaded, and securing said end of the line to prevent the same from retraction through said first named coil.

JOHN HEIDRICH.